US008659769B2

(12) United States Patent
Mikami et al.

(10) Patent No.: US 8,659,769 B2
(45) Date of Patent: Feb. 25, 2014

(54) CONTROL APPARATUS, STATE DETECTION METHOD OF CONTROL APPARATUS, STORAGE MEDIUM, AND PROGRAM THEREFOR

(75) Inventors: Fumio Mikami, Chigasaki (JP); Junnosuke Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 13/281,279

(22) Filed: Oct. 25, 2011

(65) Prior Publication Data

US 2012/0105898 A1 May 3, 2012

(30) Foreign Application Priority Data

Nov. 1, 2010 (JP) ................................. 2010-245066

(51) Int. Cl.
*G06K 15/00* (2006.01)
*G06F 3/12* (2006.01)

(52) U.S. Cl.
USPC ........ 358/1.14; 358/1.16; 358/1.15; 358/1.13

(58) Field of Classification Search
None
See application file for complete search history.

(56) References Cited

U.S. PATENT DOCUMENTS 6,174,042 B1 * 1/2001 Kobayashi et al. ............. 347/23
2009/0262379 A1 * 10/2009 Miyake et al. ............... 358/1.13

FOREIGN PATENT DOCUMENTS

JP 2004-058554 A 2/2004

* cited by examiner

*Primary Examiner* — Dov Popovici
(74) *Attorney, Agent, or Firm* — Canon USA, Inc., IP Division

(57) ABSTRACT

A control apparatus includes a state change detection unit configured to detect a state change of a particular unit and to output a state change information indicating the state change; a state detection unit configured to detect a state of the particular unit; a storage unit operable with electricity supplied by a battery and configured to store information indicating that the state change information was input; and a control unit operable with electricity supplied by a power supply different from the battery configured to determine whether the information indicating that the state change information was input is stored in the storage unit during the off-state of electricity supplied by the power supply and, when it is determined that the information is stored, to acquire the state detected by the state detection unit.

7 Claims, 9 Drawing Sheets

CONTROL APPARATUS, STATE DETECTION METHOD OF CONTROL APPARATUS, STORAGE MEDIUM, AND PROGRAM THEREFOR

BACKGROUND OF THE INVENTION

1. Field of the Invention

The present invention relates to a control apparatus, a state detection method of the control apparatus, a storage medium, and a program therefor.

2. Description of the Related Art

A conventional control apparatus, for example, an image forming apparatus, has a mechanism for holding a history about whether its head was operated in a period of time when the power remained off (e.g., Japanese Patent Application Laid-Open No. 2004-058554).

The apparatus discussed in Japanese Patent Application Laid-Open No. 2004-0588554 has a mechanism which holds a history indicating that the apparatus was operated in some ways in a period of time when its power remained off and determines whether a state detection operation for the apparatus should be executed when the power is turned on depending on whether the operation history exists.

However, whether that operation was executed during a period of time when the power remained off or before the power was turned off cannot be determined because of the mechanism of the apparatus. This problem is not confined to the aforementioned image forming apparatus but is common to an apparatus having a unit whose state changes in a period of time when the power remains off, and not a special problem for the image forming apparatus.

SUMMARY OF THE INVENTION

The present invention is directed to an apparatus in which whether the state of a unit was changed in a period of time when the power remained off is detected and whether information about the state of the unit should be acquired can be determined.

According to an aspect of the present invention, a control apparatus includes: a state change detection unit configured to detect a state change of a particular unit and to output state change information indicating the state change; a state detection unit configured to detect a state of the particular unit; a storage unit operable with electricity supplied by a battery and configured to, upon input of the state change information, store information indicating that the state change information was input; and a control unit operable with electricity supplied by a power supply different from the battery and configured to, after electricity supplied by the power supply is changed from an off-state to an on-state, determine whether the information indicating that the state change information was input is stored in the storage unit during the off-state of electricity supplied by the power supply and, when it is determined that the information is stored, to acquire the state detected by the state detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
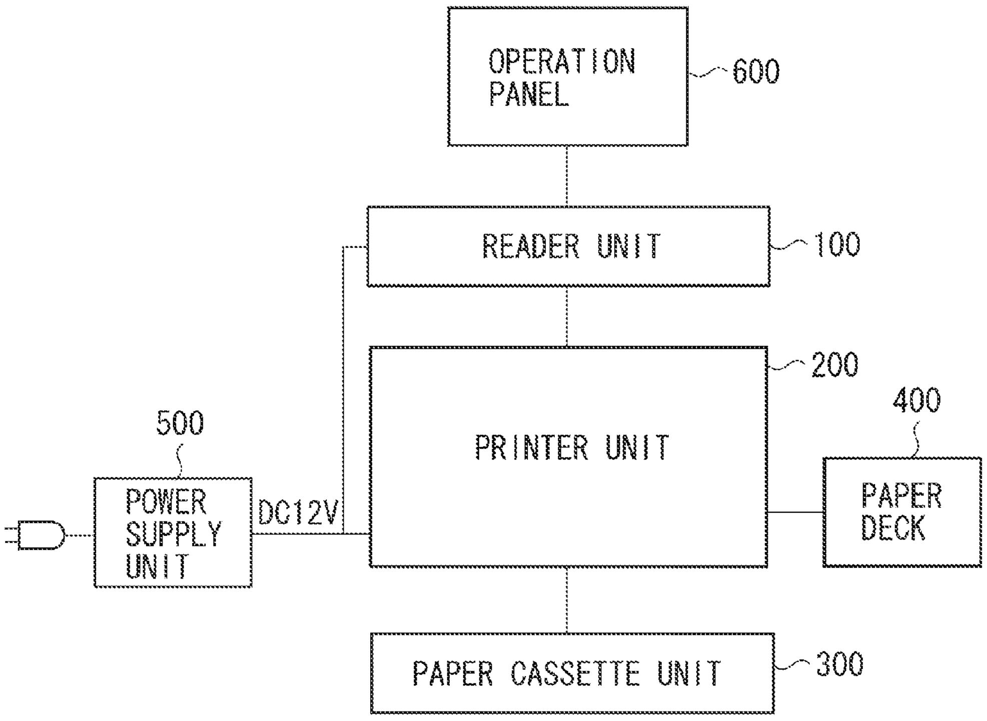
FIG. 1 is a block diagram illustrating the structure of a control apparatus according to an exemplary embodiment of the present invention.

FIG. 1 is a block diagram illustrating the structure of a control apparatus according to an exemplary embodiment of the present invention. This exemplary embodiment indicates an example that the control apparatus is a multifunction peripheral (MFP) including a print function, a copy function, a facsimile communication function and the like, and it can be also applied to a printer apparatus which executes only the print function.

In the MFP of this exemplary embodiment, a user can pull out a paper cassette from its main body after an AC power is turned off and then replace or replenish sheets of paper. When the replacement or the replenishment of sheets of paper is executed, the MFP stores and administers information indicating that the state of a paper cassette was changed by using a memory (a nonvolatile memory) in a real-time clock (RTC), which is activated by a battery as described later. Hereinafter, this exemplary embodiment will be described by taking a MFP which determines whether control for detecting the state of the apparatus, e.g., control for detecting the state of the paper cassette should be executed according to the control described below just when the AC power is turned on.

Referring to FIG. 1, a reader unit 100 reads a document by scanning it with an image sensor unit (not illustrated). In the meantime, the reader unit is so configured that its automatic document feeder (ADF) for automatically feeding the document is connectable thereto, so that the reader unit can read an image of the document fed from the ADF.

A printer unit 200 includes a printer controller unit and a printer engine unit. Here, the printer engine unit forms an image on a recording sheet according to a variety of methods, such as an electrophotographic printing method and an ink jet printing method.

A paper cassette unit 300 includes a plurality of paper cassettes which accommodate sheets of different sizes as described below. Each paper cassette is provided with a paper size switch described below, and is configured to be able to send information regarding the paper size to the printer controller unit of the printer unit 200.

A paper deck 400 is configured to accommodate a large amount of recording sheets. A power supply unit 500 generates 12 VDC from an AC power to supply respective units (including a driving unit, a high-pressure unit and a fixing unit) of an image forming apparatus with necessary electricity.

An operation panel 600 includes a display unit for displaying a variety of setting screens and hard keys, for example, a numerical keypad to accept a user's setting demand corresponding to each of various functional processing.

Figure 2:
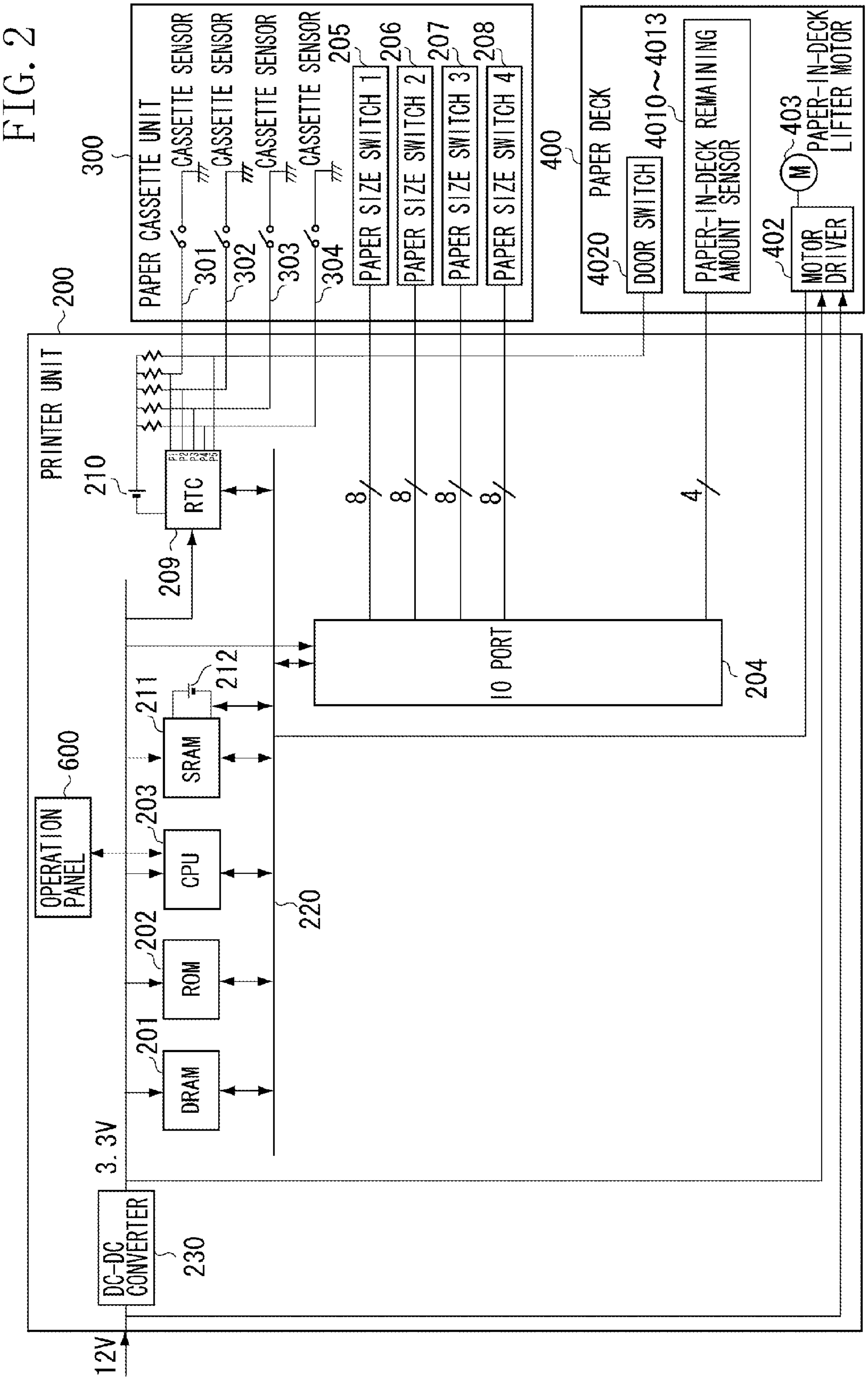
FIG. 2 is a block diagram illustrating a detailed structure of the control apparatus illustrated in FIG. 1.

FIG. 2 is a block diagram illustrating the detailed structure of the control apparatus illustrated in FIG. 1. According to this exemplary embodiment, the control apparatus includes a change detection unit for detecting a change in the state of the paper cassette and a state detection unit for detecting the size of sheets accommodated in the paper cassette.

Referring to FIG. 2, a DC-DC converter 230 converts input 12 VDC to 3.3 VDC and supplies each element with electricity. A central processing unit (CPU 203) loads a control program stored in a read only memory (ROM) 202 onto a dynamic random access memory (DRAM) 201 and executes it. An input/output (I/O) port 204 receives information output from the paper cassette unit 300 by paper size switches. Additionally, the I/O port 204 receives information output from the paper deck 400 by a paper-in-deck remaining amount sensor.

A static random access memory (SRAM) 211 is backed up by a battery. In the SRAM 211, information (event information) which is changed when the power is on is stored so as to correspond to time information acquired from an RTC 209.

The RTC 209 is supplied with electricity by a battery 210. Thus, even while the AC power is off, that is, the 12-V power is off, the clock function of the RTC 209 is active so that a time when the level of a signal to be input to each of input ports P1 to P5 was changed is memorized in a RAM inside the RTC 209. Information output from cassette sensors 301 to 304 is input to the input ports P1 to P4 of the RTC 209. Further, information output from a door switch 4020 is input to the input port P5 of the RTC 209.

Paper size switches 205 to 208 are configured to detect the size of paper accommodated in the paper cassette and provided corresponding to 4-rack paper cassettes in the paper cassette unit 300. Information output from the paper size switches 205 to 208 is received by the CPU 203 via the I/O port 204. After the power supply unit 500 is changed from an off-state to an on-state, the CPU 203 stores the information output from the paper size switches 205 to 208 in the SRAM 211. In this case, the SRAM 211 functions as a state storage unit which stores the state of the paper cassettes.

After the power supply unit 500 is changed from the off-state to the on-state, the CPU 203 determines whether any state change is stored in the RAM in the RTC 209. The RAM in the RTC 209 is backed up by electricity supplied by the battery so that the RAM in the RTC 209 stores a state change even when the power supply unit 500 is in the off-state. That is, if, after the power supply unit 500 is changed from the on-state to the off-state, the user pulls out each paper cassette to handle the cassette for replenishing sheets of paper or the like, such state change detected by the respective cassette sensors 301 to 304 due to the user's handling is stored in the RAM in the RTC 209.

Then, the CPU 203 determines whether the state change was stored in the RAM in the RTC 209 after the power supply unit 500 was changed from the off-state to the on-state. In accordance with the procedure of a flowchart described below, the CPU 203 controls whether the paper size switches 205 to 208 should be caused to detect the state of the respective paper cassettes. In the meantime, when the user pulls out the paper cassette, sometimes the paper size is changed or sometimes the paper size is not changed. Therefore, when a possibility that the paper size might be changed exists, that is, the paper cassette was pulled out, it is necessary to detect the paper size after the power supply unit 500 is changed from the off-state to the on-state.

The paper deck 400 contains paper-in-deck remaining amount sensors 4010 to 4013, which detect the remaining amount of sheets and output information about the remaining amount to the I/O port 204. The door switch 4020 outputs information about opening/closing of a door to the RTC 209 as a state change of the door. A motor driver 402 drives a motor 403 to move a paper-in-deck lifter vertically.

The paper cassette unit 300 includes cassette sensors 301 to 304 for detecting removal/insertion of each paper cassette which occurs when the user removes or attaches the paper cassette, as a state change. Each of the cassette sensors 301 to 304 functions as a state change detection unit which detects a state change due to the user's pulling out of each paper cassette and outputs the state change to the input ports P1 to P4 of the RTC 209.

Figure 3:
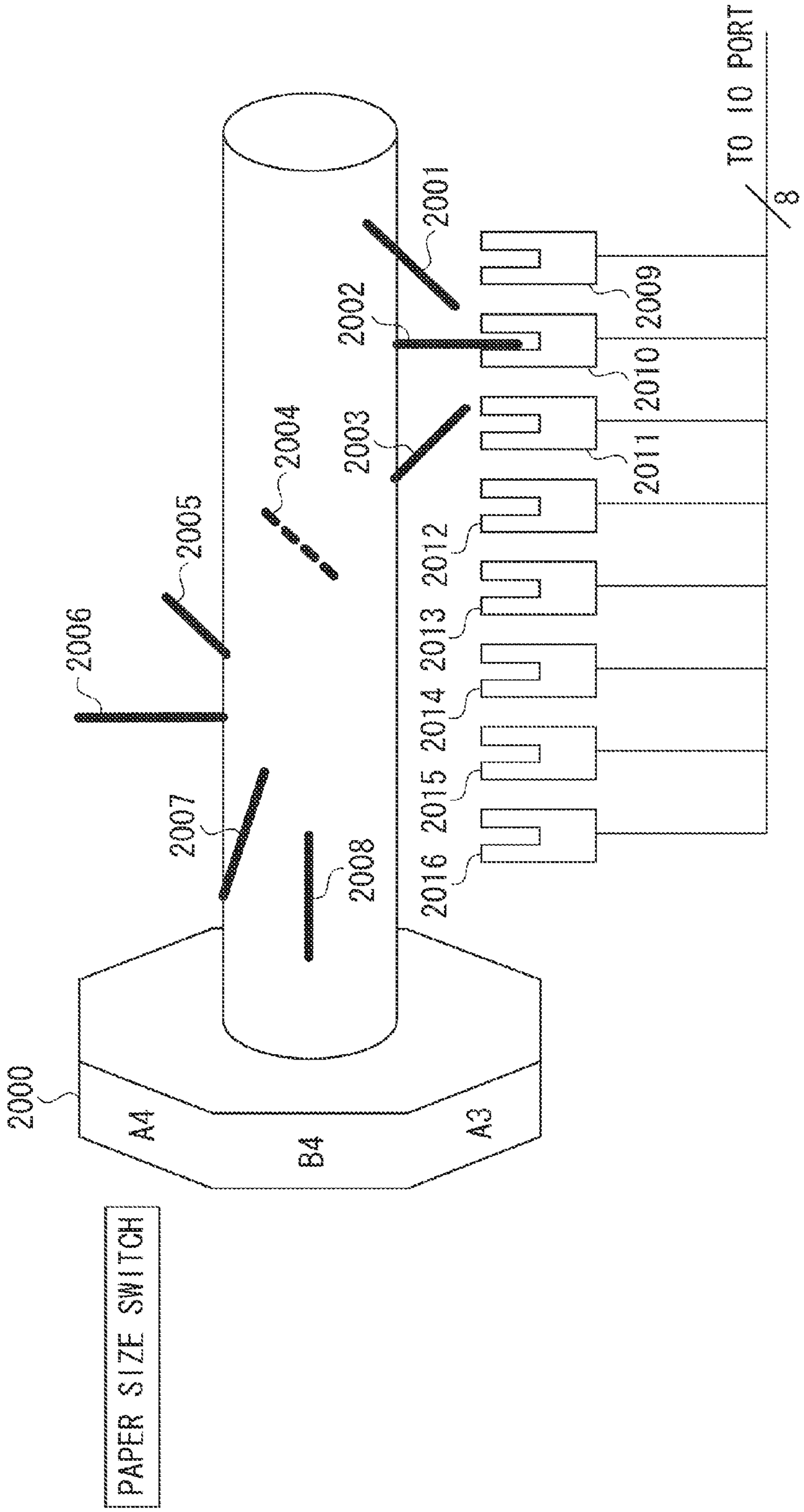
FIG. 3 is a diagram showing an example of the structure of a paper size switch illustrated in FIG. 2.

FIG. 3 is a diagram illustrating an example of the structure of the paper size switch illustrated in FIG. 2. This example shows each of the paper size switches 205 to 208 constituted of a rotary switch.

Referring to FIG. 3, when the user rotates a paper size indication unit 2000, corresponding light interception flags 2001 to 2008 come to meet photointerruptors 2009 to 2016 to output a setting state of the paper cassette to the I/O port 204 in FIG. 2. The CPU 203 reads the I/O port 204 to find the size of sheets in each paper cassette.

Figure 4:
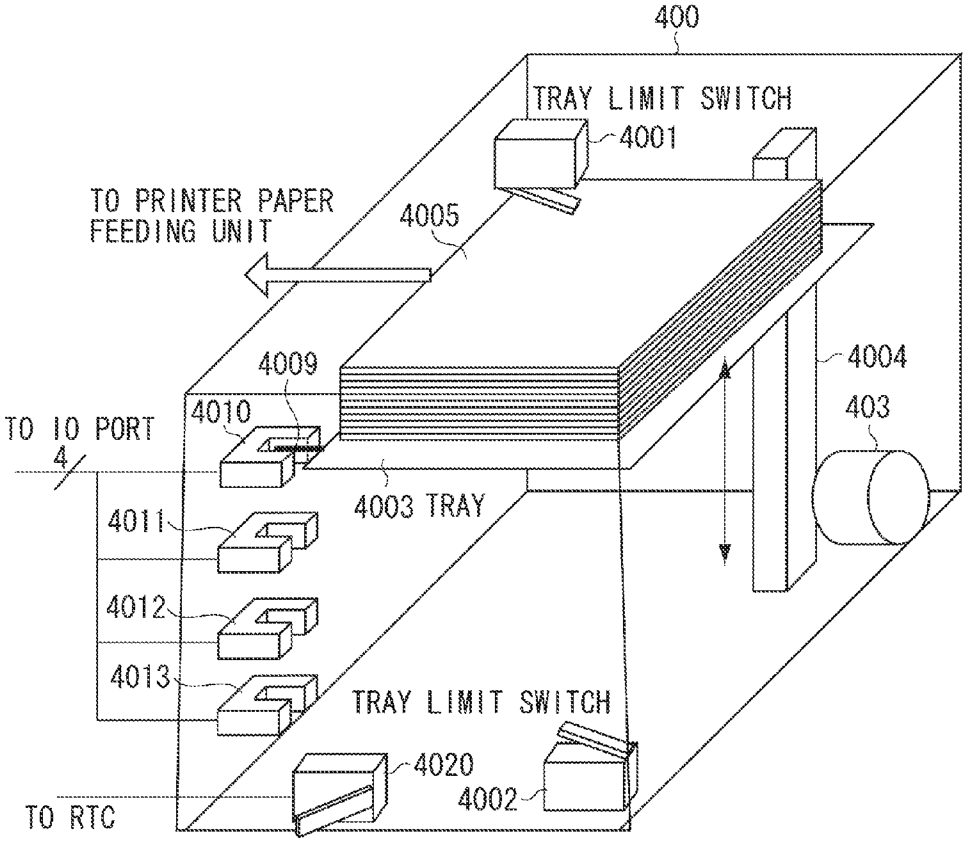
FIG. 4 is a perspective view illustrating a paper deck illustrated in FIG. 2.

FIG. 4 is a perspective view illustrating a paper deck illustrated in FIG. 2.

Referring to FIG. 4, the motor 403 drives a drive gear 4004. A tray 4003 holds sheets and is moved with sheets 4005 vertically by the drive gear 4004. A limit switch 4001 limits a movement of the sheets in an upward direction by detecting an upper limit of the paper surface through a signal line (not illustrated). On the other hand, a limit switch 4002 limits a movement of the sheets in a downward direction by detecting a lower limit of the sheets through a signal line (not illustrated).

The sheets 4005 are fed one by one to the printer unit 200 from an uppermost position of the sheets determined by the limit switch 4001. The limit switch 4001 is always kept on during use. The CPU 203 can detect the remaining amount of sheets according to a position of the tray 4003.

The paper-in-deck remaining amount sensors 4010 to 4013 each constituted of a photointerruptor detect the position of the tray 4003 by means of a flag 4009 attached to the tray 4003. The door switch 4020 is turned on/off according to opening/closing of a door (not illustrated) provided on the paper deck 400 and related information is input to the input port P5 of the RTC 209. When the door is opened (not illustrated here), the tray is released from the motor 403 and the drive gear 4004, so that the user can add or take out required sheets.

Figure 5:
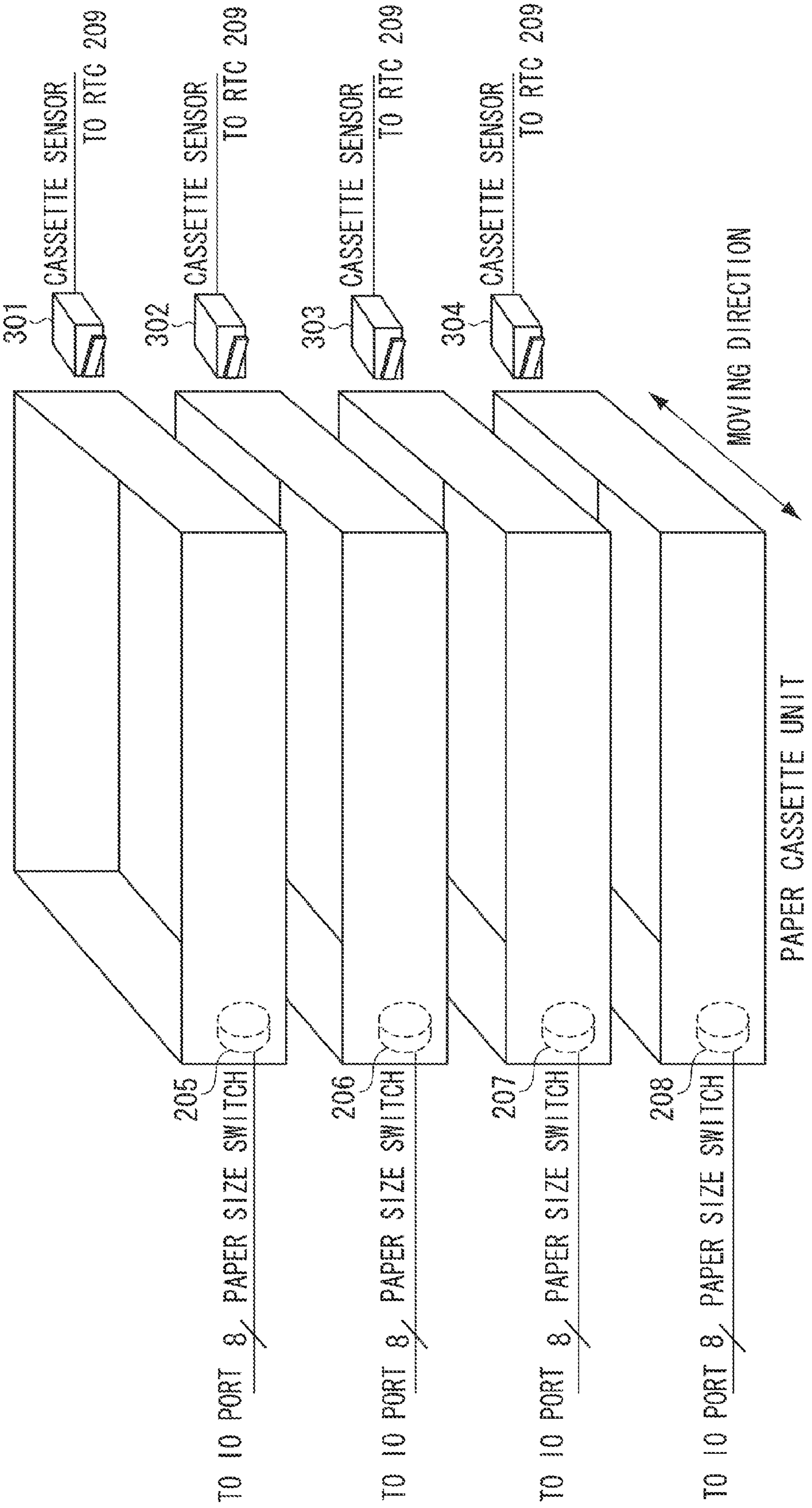
FIG. 5 is a diagram illustrating the structure of a paper cassette unit illustrated in FIG. 1.

FIG. 5 is a diagram illustrating the structure of a paper cassette unit 300 illustrated in FIG. 1. Although this example indicates a case in which the paper cassette unit may contain four paper cassettes, the number of the paper cassettes is not restricted to any particular number.

Referring to FIG. 5, the cassette sensors 301 to 304 detect that each paper cassette is pulled out by the user's operation for replenishing sheets or the like and information on the state change indicating that the paper cassette was pulled out is output from each of the cassette sensors 301 to 304 to the RTC 209. Consequently, the CPU 203 can detect the state change of the paper cassettes.

Each of the cassette sensors 301 to 304 is constituted of a microswitch capable of detecting whether the paper cassette was pulled out from a predetermined storage position. A paper size setting switch of each paper cassette is provided inside the paper cassette and the user sets a paper size by rotating a rotary switch corresponding to the paper size. The CPU 203 reads the I/O port 204 to detect a paper size set for each paper cassette.

More specifically, when the user pulls out or inserts the paper cassette, a signal output from each of the cassette sensors 301 to 304 is input to the input ports P1 to P4 of the RTC 209. If a change occurs in the signal level of the input ports P1 to P4 of the RTC 209 for that reason, an input port undergoing that change and a time when the change occurred are stored in the RAM in the RTC 209 in a corresponding manner therebetween.

When the AC power of the MFP is turned on, the power supply unit 500 generates 12 VDC and supplies the reader unit 100 and the printer unit 200 with electricity.

When the power is turned on, the CPU 203 of the printer unit 200 in FIG. 2 reads the state change stored in the RAM in the RTC 209 to detect whether a history indicating that the paper cassette was pulled out exists. When the CPU 203 detects that the state change occurred in a period of time when the AC power was changed from the on-state to the off-state in any of the input ports P1 to P4 of the RTC 209, after the AC power is changed from the off-state to the on-state, the CPU 203 reads information output from any of the paper size switches 205 to 208 of a corresponding paper cassette from the I/O port 204. That is, after the AC power is changed from the off-state to the on-state, the CPU 203 detects the state of the paper size switches 205 to 208 to detect the paper size of each paper cassette.

When the CPU 203 detects a history indicating that the signal level of the input port P5 of the RTC 209 was changed, a possibility that the door of the paper deck 400 was opened and sheets of paper were added or removed is made evident. When the power is turned on, the tray 4003 is moved vertically by the motor 403 up to the upper limit position of the limit switch. The CPU 203 reads information output from the paper-in-deck remaining amount 4010 to 4013 from the I/O port 204 and determines which of the paper-in-deck remaining amount sensors 4010 to 4013 the flag 4009 is located at to detect the remaining amount of the sheets 4005.

On the other hand, if the CPU 203 determines that no change occurred in any of the input ports P1 to P5 of the RTC 209 according to the state of the RAM in the RTC 209 when the AC power was changed from the off-state to the on-state, no change was generated in the state of the paper cassette and sheets in the paper deck. This case does not need to execute a state detection of detecting the size of sheets in each paper cassette and a state detection of detecting the remaining amount in the paper deck 400 by reading information output from the paper size switches 205 to 208.

In this case, the CPU 203 reads a paper size set on the paper cassette or a remaining amount of sheets in the paper deck 400 just before the AC power was turned off last time from the SRAM 211 which is a nonvolatile memory. The CPU 203 displays a paper size set on each paper cassette and a remaining amount of sheets existing in the paper deck 400 on the operation panel 600 through a user interface illustrated in FIG. 6, for example.

The RAM in the RTC 209 stores a time when the AC power was turned on and a time when the AC power was turned off, respectively. After the AC power is turned on, the CPU 203 detects the state of the paper cassettes and the paper deck, and stores the size of sheets on the paper cassette which is changed during use and a remaining amount of sheets in the paper deck which is changed during use in the SRAM 211, respectively.

Figure 7:
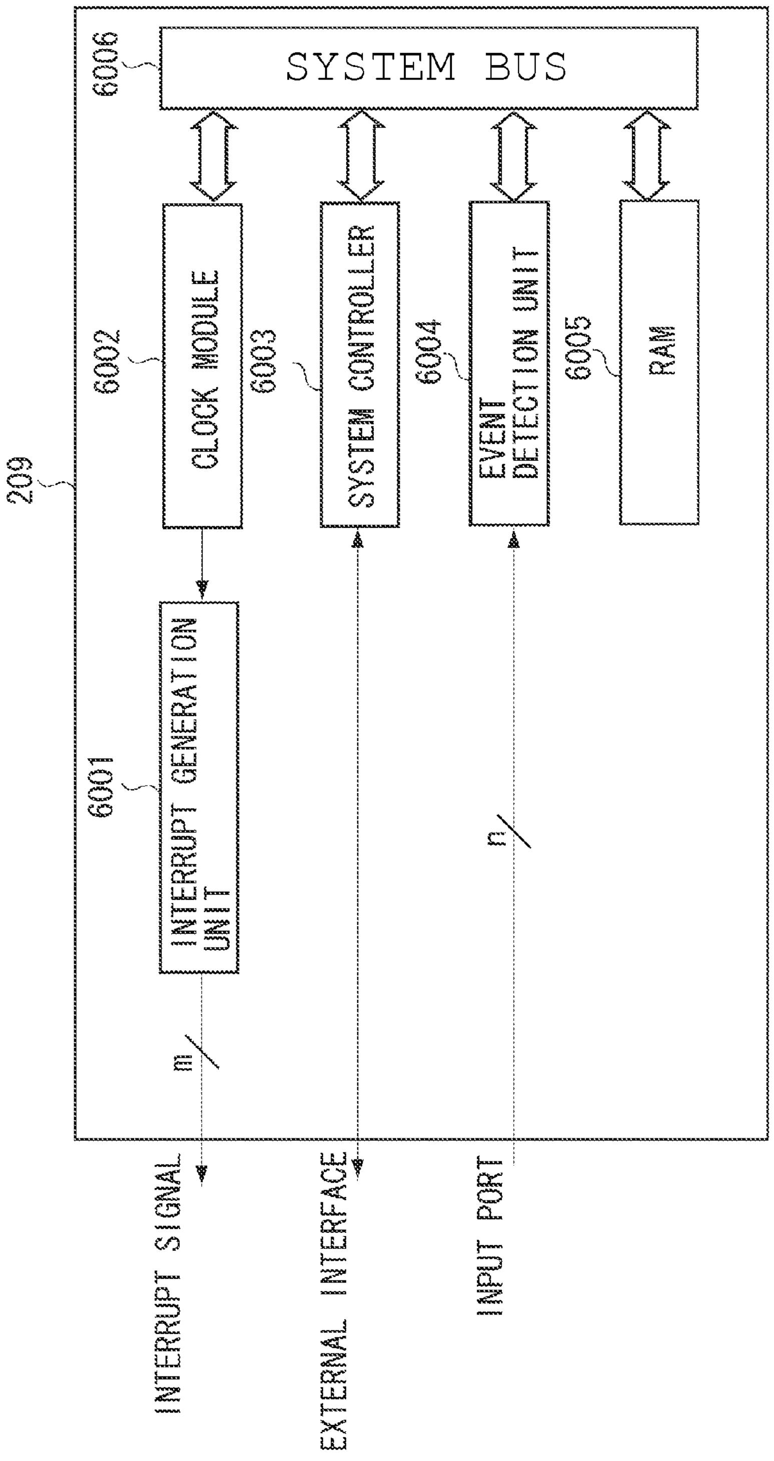
FIG. 7 is a block diagram illustrating the configuration of a real-time clock (RTC) illustrated in FIG. 2.

FIG. 7 is a block diagram illustrating the structure of the RTC 209 illustrated in FIG. 2. According to this exemplary embodiment, the RTC 209 functions as a clock unit (a clock module 6002 described below) which measures the time with electricity supplied by a battery. Further, the RTC 209 contains a memory (a RAM 6005 described below) which stores information to be input corresponding to the time measured by the clock unit with electricity supplied by the battery. Consequently, the RTC 209 functions as a timer which functions as a clock unit and a memory at the same time. The apparatus having such a timer is not limited to the control apparatus of this exemplary embodiment but may be an apparatus which executes a variety of data processing by using a timer function and a memory function.

Referring to FIG. 7, the clock module 6002 instructs an interrupt generation unit 6001 to generate an interrupt signal and is connected to a system bus 6006 within the RTC 209.

A system controller 6003 controls each device connected to the system bus 6006 within the RTC 209. The system controller 6003 receives a timer setting information sent to the clock module 6002 from an external interface terminal or a read/write instruction for the RAM 6005.

An event detecting unit 6004 detects a state change of input to the input ports. That is, the event detecting unit 6004 detects whether a signal of the input port was changed from H to L or from L to H, and stores its occurrence time and identification information of the input port in a corresponding manner therebetween in the RAM 6005 via the system bus 6006. In the meantime, the RAM 6005 functions as a nonvolatile memory unit which always stores information with a DC power supplied by a button battery or the like.

Figure 8A:
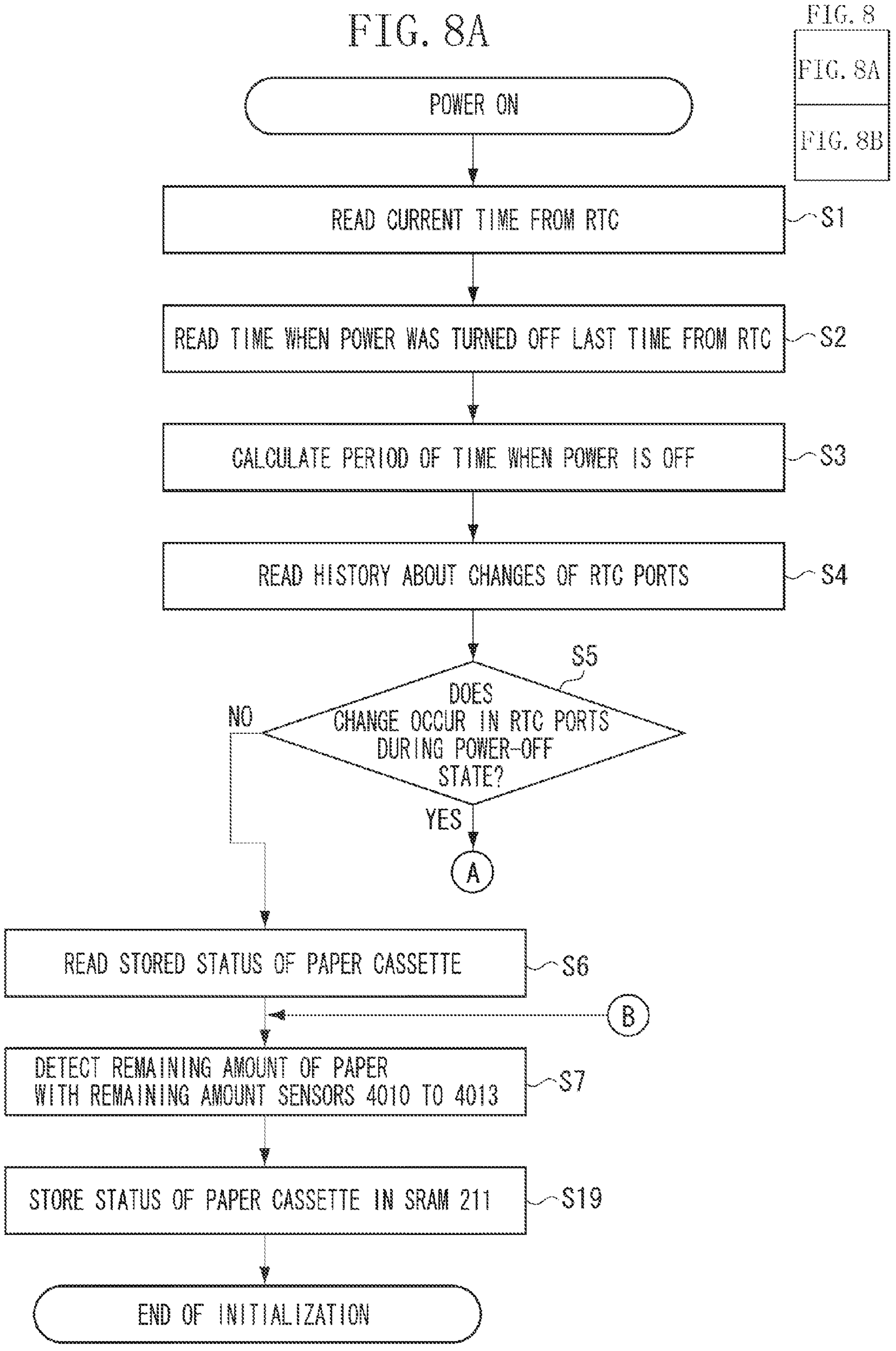
FIGS. 8A and 8B are flowcharts indicating a control procedure for the control apparatus.
Figure 8B:
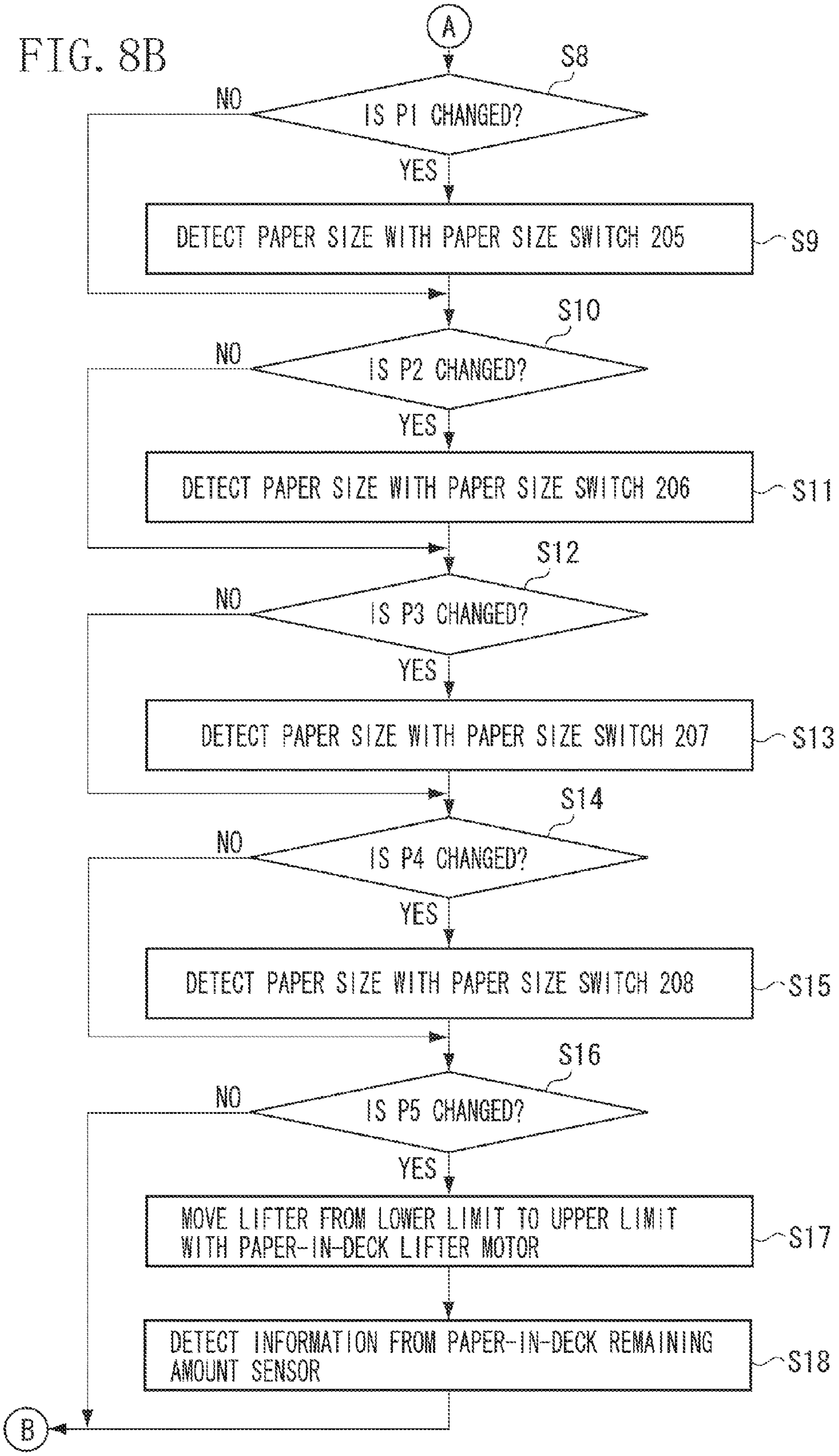

FIGS. 8A and 8B are a flowchart indicating a control procedure for the control apparatus. This example indicates an initialization processing example achieved when the CPU 203 loads a control program on the DRAM 201 and executes it.

When the user turns on a power supply switch, the AC power of the MFP main body is turned on to start this initialization processing. In step S1, the CPU 203 reads a current time measured by the clock module 6002 of the RTC 209.

Next, in step S2, the CPU 203 reads a time when the AC power was turned off last time, which is stored in the RAM 6005 in the RTC 209. In step S3, the CPU 203 calculates a period of time when the AC power remained off (OFFT) based on the current time read in step S1 and the time when the AC power was turned off last time, read in step S2.

Next, in step S4, the CPU 203 reads information indicating the history of changes of the input ports of the RTC 209 from the RAM 6005. In step S5, the CPU 203 determines whether a state change (a history of changes) indicating that the states of the cassette sensors 301 to 304 and the door switch 4020 were changed during the off-state of the AC power (OFFT) is stored.

Figure 6:
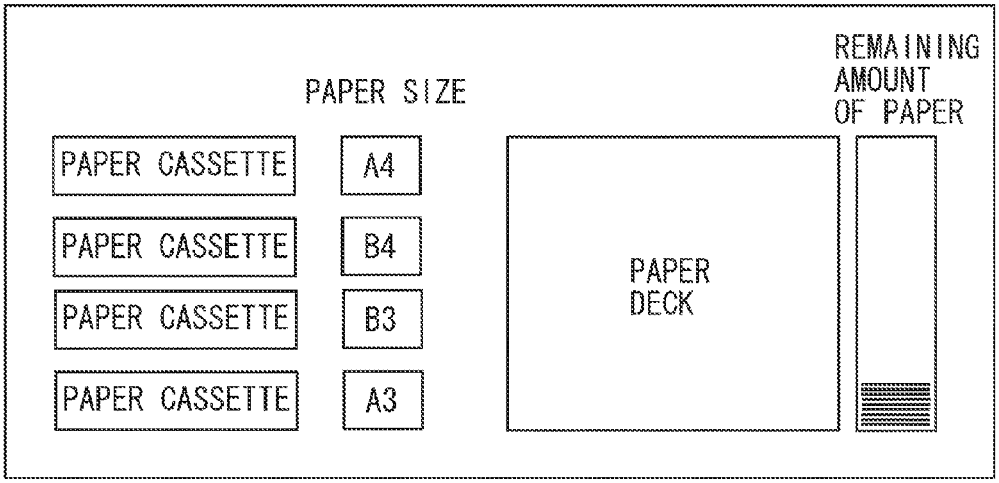
FIG. 6 is a diagram illustrating an example of a user interface (UI) displayed on the operation unit illustrated in FIG. 2.

If the CPU 203 determines that no state change is stored, in step S6, the CPU 203 reads a state of each paper cassette when the AC power was turned off last time from the SRAM 211 and in step S7, displays a user interface illustrated in FIG. 6 on the operation panel 600.

On the other hand, if the CPU determines that a state change occurred in any of the input ports P1 to P4 during the off-state of the AC power (OFFT) and the state change is stored in the RAM 6005, the processing proceeds to step S8.

In step S8, the CPU 203 determines whether information indicating that a change in signal level occurred in the input port P1 is stored in the RAM 6005. If such information is stored, in step S9, the CPU 203 reads information of the paper size switch 205 to acquire a paper size of a corresponding paper cassette.

In step S10, the CPU 203 determines whether information indicating that a change in signal level occurred in the input port P2 is stored in the RAM 6005. If such information is stored, in step S11, the CPU 203 reads information of the paper size switch 206 to acquire a paper size of a corresponding paper cassette.

In step S12, the CPU 203 determines whether information indicating that a change in signal level occurred in the input port P3 is stored in the RAM 6005. If such information is stored, in step S13, the CPU 203 reads information of the paper size switch 207 to acquire a paper size of a corresponding paper cassette.

In step S14, the CPU 203 determines whether information indicating that a change in signal level occurred in the input port P4 is stored in the RAM 6005. If such information is stored, in step S15, the CPU 203 reads information of the paper size switch 208 to acquire a paper size of a corresponding paper cassette.

In step S16, the CPU 203 determines whether information indicating that a change in signal level occurred in the input port P5 is stored in the RAM 6005. If the CPU 203 detects that the change occurred in the input port P5, the processing proceeds to step S17.

Then, in step S17, the CPU 203 activates the motor 403 for the lifter in the paper deck 400 and in step S18, the CPU 203 reads information of the paper-in-deck remaining amount sensors 4010 to 4013 to acquire the remaining amount of paper.

Next, in step S7, the CPU 203 displays the remaining amount of paper in the paper deck 400 on the operation panel 600 by using the user interface illustrated in FIG. 6. In step S19, the CPU 203 stores a state of each paper cassette detected in steps S8, S10, S12, S14 in the SRAM 211 and terminates this processing.

Because a conventional image forming apparatus has no unit for detecting whether any state change occurred in the paper cassette during the power-off state, the CPU 203 always executes a flow corresponding to steps S9, S11, S13, S15, S17 and S18.

According to this exemplary embodiment, if the CPU 203 determines that the state of paper was changed during the power-off state according to the state changes (the history of changes) stored in the RAM 6005 backed up by a battery in the RTC 209, a necessity of the processing for detecting the state of paper is eliminated. That is, when the CPU 203 determines that the state of paper was not changed during the power-off state, the processing for the state detection of steps S8 to S18 can be omitted.

Consequently, in the control apparatus for controlling the image forming apparatus, the state detection processing conventionally executed when the power is turned on can be omitted, so that the image forming apparatus can get into a status enabling formation of images soon, thereby improving user-friendliness. In the meantime, although the above exemplary embodiment has been described by assuming a case in which the paper cassette was pulled out when changing the AC power from the off-state to the on-state, the present invention may be applied to detecting a unit or a member which may undergo other kinds of state change, by using the same method as described above.

As described above, according to the present invention, whether information about the state of the unit should be acquired when turning on the power can be determined by checking whether the state of the unit was changed while the power remained off.

Aspects of the present invention can also be realized by a computer of a system or apparatus (or devices such as a CPU or MPU) that reads out and executes a program recorded on a memory device (computer-readable medium) to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-245066 filed Nov. 1, 2010, which is hereby incorporated by reference herein in its entirety.

What is claimed is:

1. A control apparatus comprising:

a state change detection unit configured to detect a state change of a particular unit and to output state change information indicating the state change;

a state detection unit configured to detect a state of the particular unit;

a storage unit operable with electricity supplied by a battery and configured to, upon input of the state change information, store information indicating that the state change information was input; and a control unit operable with electricity supplied by a power supply different from the battery and configured to, after electricity supplied by the power supply is changed from an off-state to an on-state, determine whether the information indicating that the state change information was input is stored in the storage unit during the off-state of electricity supplied by the power supply and, when it is determined that the information is stored, to acquire the state detected by the state detection unit.

2. The control apparatus according to claim 1 further comprising a state storage unit configured to store the state detected by the state detection unit when electricity supplied by the power supply is turned on, wherein, when the control unit does not determine that the information indicating that the state change information was input is stored in the storage unit during the off-state of electricity supplied by the power supply, the control unit acquires the state stored by the state storage unit without acquiring the state detected by the state detection unit.

3. The control apparatus according to claim 2 further comprising a display unit configured to, when the control unit does not determine that the information indicating that the state change information was input is stored, display the state stored by the state storage unit.

4. The control apparatus according to claim 1, wherein the state detection unit detects a paper size of a paper cassette.

5. The control apparatus according to claim 4, wherein the state change detection unit detects that the paper cassette is moved.

6. A method comprising:

detecting a state change of a particular unit and outputting state change information indicating the state change;

detecting a state of the particular unit by a state detection unit;

storing information in a storage unit, upon input of the state change information, indicating that the state change information was input;

determining, after application of power, whether the information indicating that the state change information was input is stored in the storage unit during a period where no power is applied; and acquiring, after determining that the information indicating that the state change information was input is stored, the state detected by the state detection unit.

7. A non-transitory computer-readable storage medium storing a program for executing the method of claim 6.

* * * * *